United States Patent
Wu et al.

(10) Patent No.: US 9,770,782 B2
(45) Date of Patent: Sep. 26, 2017

(54) UNCOILING AND BLANKING METHOD

(71) Applicant: BAOSHAN IRON & STEEL CO., LTD., Shanghai (CN)

(72) Inventors: Ruimin Wu, Shanghai (CN); Chengguo Jin, Shanghai (CN); Wenhai Jin, Shanghai (CN); Saidan Yang, Shanghai (CN); Junliang Qiao, Shanghai (CN); Shengbo Pan, Shanghai (CN); Yuming Wang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 69 days.

(21) Appl. No.: 14/759,458

(22) PCT Filed: Apr. 28, 2014

(86) PCT No.: PCT/CN2014/076318
§ 371 (c)(1),
(2) Date: Jul. 7, 2015

(87) PCT Pub. No.: WO2014/177030
PCT Pub. Date: Nov. 6, 2014

(65) Prior Publication Data
US 2016/0039047 A1    Feb. 11, 2016

(30) Foreign Application Priority Data
Apr. 28, 2013   (CN) .......................... 2013 1 0157684

(51) Int. Cl.
*B23K 26/00*    (2014.01)
*B23K 26/08*    (2014.01)
(Continued)

(52) U.S. Cl.
CPC ...... *B23K 26/0846* (2013.01); *B23K 26/0604* (2013.01); *B23K 26/38* (2013.01); *B23K 26/083* (2013.01); *B23K 2201/18* (2013.01)

(58) Field of Classification Search
CPC .............. B23K 26/0604; B23K 26/083; B23K 26/0838; B23K 26/0846; B23K 26/38;
(Continued)

(56) References Cited

U.S. PATENT DOCUMENTS 4,656,857 A * 4/1987 Tomita ............... B23D 36/0008
72/131
8,253,064 B2 * 8/2012 Beck .................. B23K 26/0846
219/121.67
(Continued)

FOREIGN PATENT DOCUMENTS

CN   1652895 A   8/2005
CN   102105256 A   6/2011
(Continued)

OTHER PUBLICATIONS

PCT International Search Report, PCT/CN2014/076318, dated Aug. 4, 2014, 6 pages.

*Primary Examiner* — Sang Y Paik
(74) *Attorney, Agent, or Firm* — Quarles & Brady LLP

(57) ABSTRACT

An uncoiling and blanking method includes uncoiling a coiled strip, straightening, cutting off the leading end, moving into a looper, moving out of the looper, then cleaning the surface of the coiled strip, and flattening; conveying the coiled strip on a pinch roller to perform laser cutting and blanking, wherein dual static laser cutting heads are used for cutting the coiled strip during the laser cutting, and the cut-away waste materials fall down from the cutting region and are conveyed to the outside; and after the completion of cutting, finally cutting off the obtained sheets from each other, receiving them by a receiving device and conveying (Continued)

same on a conveying belt to a picking up and stacking region to stack the sheets. An uncoiling and blanking method of the present invention adopts laser static cutting, can effectively improve the operation speed and yield by means of cooperative operation of two laser cutting heads, replaces the die blanking method, and has no die or maintenance cost associated therewith, requires no die stacking space, has a more flexible operation mode, simplifies the layout of the production line, and is easy to handle.

5 Claims, 3 Drawing Sheets

(51) Int. Cl.
  *B23K 26/38* (2014.01)
  *B23K 26/06* (2014.01)
  *B23K 101/18* (2006.01)
(58) Field of Classification Search
  CPC ........ B23K 37/0211–37/0223; B23K 37/0229; B23K 26/0884; B23K 26/40; B23K 26/702; B23K 37/00; B23K 37/0235; B23K 37/0408; B23K 2201/18; B23K 2203/04
  USPC .......................................... 219/121.6–121.83
  See application file for complete search history.

(56) References Cited

U.S. PATENT DOCUMENTS

| | | | |
|---|---|---|---|
| 2006/0118529 A1* | 6/2006 | Aoki | B23K 26/0846 219/121.67 |
| 2006/0191630 A1 | 8/2006 | Tait et al. | |
| 2010/0043514 A1 | 2/2010 | Holmquist et al. | |

FOREIGN PATENT DOCUMENTS

| | | |
|---|---|---|
| CN | 102452002 A | 5/2012 |
| CN | 102490070 A | 6/2012 |
| CN | 103600172 A | 2/2014 |
| CN | 103624487 A | 3/2014 |
| JP | H0760467 A | 3/1995 |
| JP | H09314365 A | 12/1997 |
| JP | 2011512259 A | 4/2011 |
| WO | 9609148 A1 | 3/1996 |

* cited by examiner

UNCOILING AND BLANKING METHOD

CROSS-REFERENCE TO RELATED APPLICATIONS

This application represents the national stage entry of PCT International Application No. PCT/CN2014/076318 filed Apr. 28, 2014, which claims priority of Chinese Patent Application No. 201310157684.1 filed Apr. 28, 2013, the disclosures of which are incorporated by reference here in their entirety for all purposes.

FIELD OF THE INVENTION

The present invention relates to automobile plate coil machining, and more specifically, to an uncoiling and blanking method.

BACKGROUND

Currently, facing with various limitations presented by traditional die blanking lines, a steel machining centre or an entire car plant has an urgent need for a flexible blanking line which reduces costs in the design, fabricating, storage and maintenance of dies, shortens the research and fabricating time, such as the die development and test period, and also meets the increasing market demand on new vehicle models and small-batch personalized vehicle models.

In Chinese patent application No. CN102105256, at least two movable door frames and at least one movable laser cutting head for each portal frame are provided for cutting by moving in a transverse or longitudinal direction, and during the cutting, a plate strip is moved, and the cutting head moves along with the plate strip to perform dynamic cutting; in this way a production yield close to that with a conventional blanking line can be achieved. However, in the case of such a plate strip movement, it is difficult to ensure alignment of transverse or longitudinal cuts generated by multiple moving cutting heads during the movement of the plate strip; and there are also some technical difficulties such as in achieving follow-up movement of a laser cutting head in a dynamic high-speed cutting operation.

Chinese patent application No. CN03811400 discloses a laser cutting device, a laser cutting method and a laser cutting system, wherein two telescopic belt conveying mechanisms are used in a cutting region to feed and receive materials, during which intermittent cutting is done, thereby avoiding damage to the parts and achieve dust absorption, with recycling of waste materials left from the cutting being done downstream of the cutting device. This patent also discloses an embodiment comprising a material delivery device, a machining head, a head moving device, and an upstream and a downstream side support device. By way of branched output or by supplying laser rays to two machining head differently in terms of time, one machining head performs an edge cutting operation upstream of a pinch roller, and the other machining head performs a sheet cutting operation in a cutting region. The machining heads between two belt conveying mechanisms inevitably comes into direct cutting contact with the belts in the cutting region, thus affecting the detection and replacement of the conveying belts, and affecting continuous production by the system; at the same time, there is also a possibility for small waste material pieces to fall from the cutting region.

This patent (Patent Application No. CN03811400) is based on increased material utilization resulting from laser cutting, and has many advantages such as strong adaptation to sheet thickness and width, elimination of the need of specialized dies, and great simplification of the production line. However, there exists a conflict between the requirements on high speed and high yield of the production line and the requirements on reliable cutting quality and smooth removal of wastes, which conflict remains a technical difficulty when applying high-speed laser cutting to material machining.

SUMMARY

An object of the present invention is to provide an uncoiling and blanking method, which adopts laser static cutting, that can effectively improve the operation speed and yield by means of cooperative operation of two laser cutting heads, replaces the die blanking method, and has no die or maintenance cost associated therewith, requires no die stacking space, has a more flexible operation mode, simplifies the layout of the production line, and is easy to handle.

To achieve the above-mentioned object, a technical solution of the present invention is as follows.

An uncoiling and blanking method includes the following steps: uncoiling a coiled strip, straightening, cutting off the leading end, moving into a loop, moving out of the looper, then cleaning the surface of the coiled strip, and flattening; conveying the coiled strip on a pinch roller to perform laser cutting and blanking, wherein dual static laser cutting heads are used for cutting the coiled strip during the laser cutting, and the cut-away waste materials fall down from the cutting region and are conveyed to the outside; and after the completion of cutting, finally cutting off the obtained sheets from each other, receiving them by a receiving device and conveying same on a conveying belt to a picking up and stacking region to stack the sheets.

Further, the laser cutting process adopts a regional static cutting mode by dual laser cutting heads, with the cutting region being dynamically adjusted depending of the sheet shape; and during a cutting operation in the cutting region, the plate strip is stationary, and after the laser cutting head completes the cutting operation, the plate strip is moved step by step.

In addition, two laser cutting heads are responsible for different regions of a sheet, i.e., a first laser cutting head does not perform a cutting of operation between sheets in a cutting region, and the second laser cutting head performs a cutting off operation between sheets in a cutting region to separate the sheets from each other; after cutting off, the sheets are received by the receiving device and conveyed on the conveying belt to the stacking region; and after the coiled strip advances a step, cutting is continued to obtain one sheet during the step, the length of the step being determined by the length of the sheet.

When one sheet is cut from the cutting region, firstly the leading end of the plate strip enters a first cutting region, a first laser cutting head cuts a front part of a first sheet, and after the completion of the cutting, the plate strip advances the length of one sheet; then a second laser cutting head cuts the rest of the first sheet, and at the same time, the first laser cutting head cuts a front part of a second sheet, and the second laser cutting head separates and cuts off the first sheet from the second sheet while the first laser cutting head does not separate or cut off the first sheet from the second sheet; when the two laser cutting heads complete the cutting operations in this region, the plate strip advances a step, the first sheet is received by the receiving device and conveyed on the conveying belt to the stacking region; then the second laser cutting head cuts the rest of the second sheet, and at the same time the first laser cutting head cuts a front part of a third sheet, and the second laser cutting head separates and cuts off the second sheet from the third sheet while the first laser cutting head does not separate or cut off the second sheet from the third sheet; after the two laser cutting heads complete the cutting operations in the cutting region, the plate strip advances a step; the second sheet is received by the receiving device and then conveyed on the conveying belt to the stacking region; and the above steps are repeated.

When more than two sheets are cut from the cutting region, the leading end of the plate strip enters a first cutting region, a first laser cutting head partially cuts the more than two sheets, and after the completion of the cutting, the plate strip advances the length of one sheet; then a second laser cutting head cuts the rest of a first sheet of the sheets, and at the same time the first laser cutting head partially cuts a third sheet, and the second laser cutting head separates and cuts off the first sheet from a second sheet; after the two laser cutting heads complete the cutting operations in this region, the plate strip advances a step, and the first sheet is received by the receiving device and conveyed on the conveying belt to the stacking region; then the second laser cutting head cuts the rest of the second sheet, and at the same time the first laser cutting head partially cuts a fourth sheet, and the second laser cutting head separates and cuts off the second sheet from the third sheet; after the two laser cutting heads complete the cutting operations in the region, the plate strip advances a step; the second sheet is received by the receiving device and then conveyed on the conveying belt to the stacking region; and such a process is repeated.

The waste material from the cutting region is conveyed outside in such a way that the waste material is transversely conveyed below the cutting region and falls into a side waste basket.

The waste material from cutting region falls down via, a liner die, in which a support device is provided on the liner die below a position corresponding to the sheets, and the rest of the liner die is a hollow left for the waste material to fall through; and during cutting, the cutting path does not interfere with the support device of the liner die to ensure the cutting quality.

The advantages of the present invention are as follows.

The present invention provides a flexible blanking method using laser static cutting, i.e., a plate strip being cut in a static state; there is little difficulty in aligning cuts of the plate strip during cutting by two laser cutting heads; and by cooperative operation of the two laser cutting heads, the operation speed and yield can be effectively improved, and thus the method is suitable for small- or medium-batch production in a machining center or an entire car plant. Meanwhile, the present invention adopts a liner die to replace the die blanking method, and has no die or maintenance cost associated therewith, requires no die stacking space, has a more flexible operation mode, simplifies the layout of the production line, and is easy to handle.

DETAILED DESCRIPTION

Figure 1:
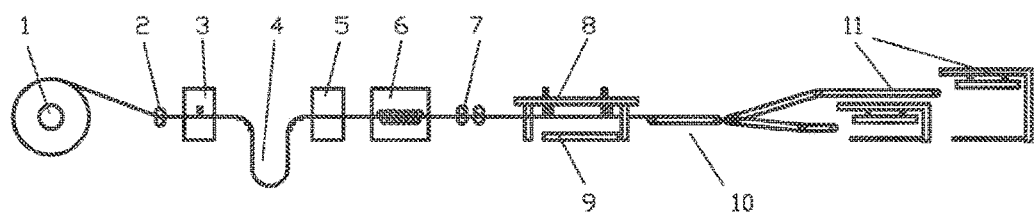
FIG. 1 is a schematic view of an uncoiling and blanking system of the present invention.

Referring to FIG. 1, an uncoiling and blanking method of the present invention includes uncoiling 1 a coiled strip, straightening 2, cutting off 3 the leading end, moving into a looper 4, moving out of the looper 4, then cleaning 5 the surface of the coiled strip, and flattening 6; conveying the coiled strip on a pinch roller 7 to perform laser cutting and blanking 8, wherein dual static laser cutting heads are used for cutting the coiled strip during the laser cutting, and the cut-away waste materials fall down from the cutting region and are conveyed to the outside; and after the completion of cutting, finally cutting off the obtained sheets from each other, receiving them by a receiving device 10 and conveying same on a conveying belt to a picking up and stacking region to stack the sheets by using a sheet picking-up and stacking device 11.

According to this embodiment, two stacking stations are provided for stacking the sheets, namely a first stacking station and a second stacking station.

According to this embodiment, the waste material from the cutting region falls down and is conveyed outside in such a way that the waste material is transversely conveyed 9 below the cutting region and falls into a side waste basket.

The waste material from cutting region falls down via a liner die, in which a support device is provided on the liner die below a position corresponding to the sheets and recyclable waste material, and the rest of the liner die is a hollow left for the waste material to fall through; and during cutting, the cutting path does not interfere with the support device of the liner die to ensure the cutting quality.

Figure 2:
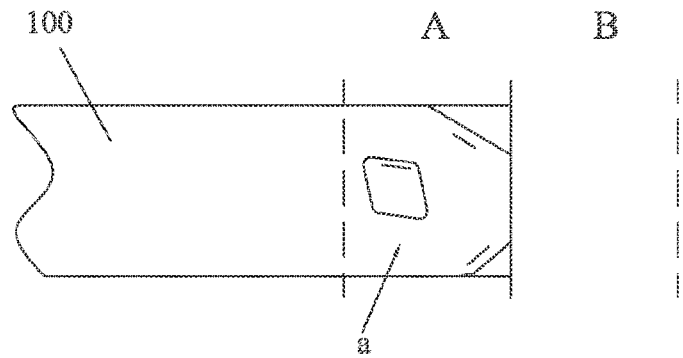
FIGS. 2-4 are schematic diagrams showing the cutting according to an uncoiling and blanking method of a first embodiment of the present invention.
Figure 3:
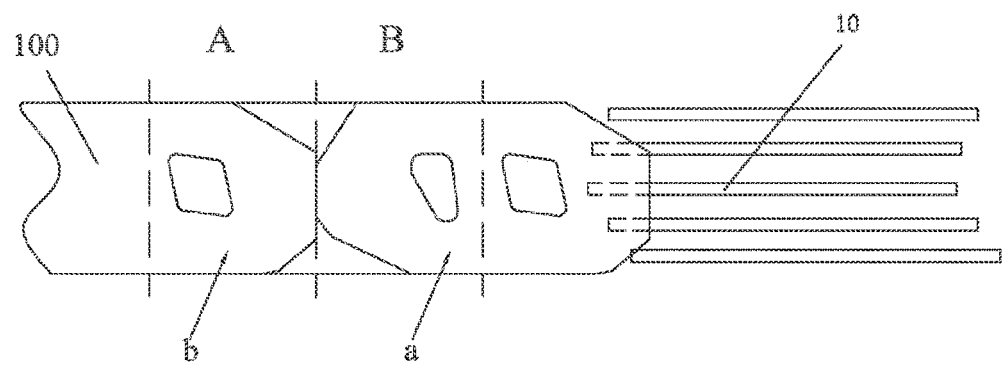
Figure 4:
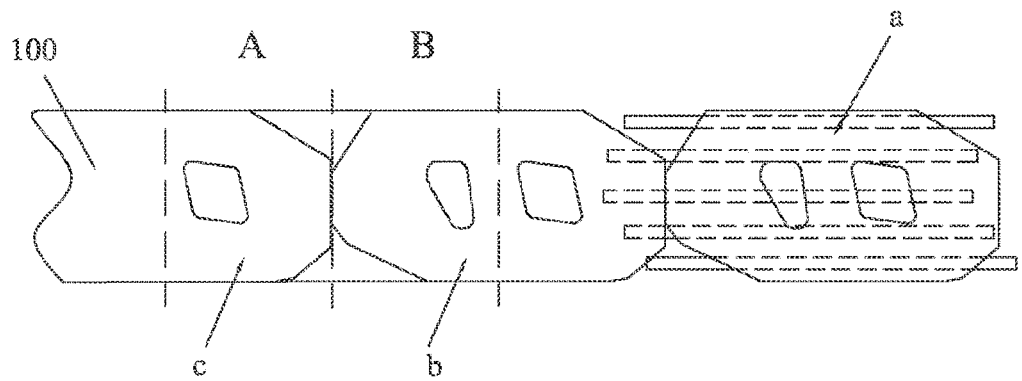

Referring to FIGS. 2-4, FIGS. 2-4 are schematic diagrams showing the cutting of one sheet by a method of the present invention.

The laser cutting adopts a regional static cutting method using two laser cutting heads, in which two laser cutting heads are responsible for different regions of a first sheet a, wherein a first laser cutting head does not perform a cutting off operation between sheets in a cutting region A, and the second laser cutting head performs a separating and cutting off operation between sheets in a cutting region B to separate the sheets from each other; after cutting off, the sheets are received by the receiving device 10 and conveyed on the conveying belt to the stacking region; and after the coiled strip (plate strip 100) advances a step, cutting is continued to obtain one sheet during the step, the length of the step being determined by the length of the sheet.

Referring to FIGS. 2-4, when one sheet is cut from the cutting region, firstly the leading end of the plate strip 100 enters a first cutting region A, a first laser cutting head cuts a front part of a first sheet a (i.e., the sheet), and after the completion of the cutting, the plate strip 100 advances the length of one sheet; then two laser cutting heads perform cutting at the same time, a part of the first sheet a is on the receiving device 10, as shown in FIG. 3, the second laser cutting head cuts the rest of the first sheet a, and at the same time the first laser cutting head cuts a front part of a second sheet b, and the second laser cutting head separates and cuts off the first sheet a from the second sheet b while the first laser cutting head does not separate or cut off the first sheet a from the second sheet b; when the two laser cutting heads complete the cutting operations in this region, the plate strip 100 advances a step, as shown in FIG. 4, and the first sheet a is received by the receiving device 10 and conveyed on the conveying belt to the stacking region; then the second laser cutting head cuts the rest of the second sheet b, and at the same time the first laser cutting head cuts a front part of a third sheet c, and the second laser cutting head separates and cuts off the second sheet b from the third sheet c while the first laser cutting head does not separate or cut off the second sheet b from the third sheet c; when the two laser cutting heads complete the cutting operations in this cutting region, the plate strip 100 advances a step; the second sheet b is received by the receiving device 10 and conveyed on the conveying belt to the stacking region; and such a process is repeated.

Figure 5:
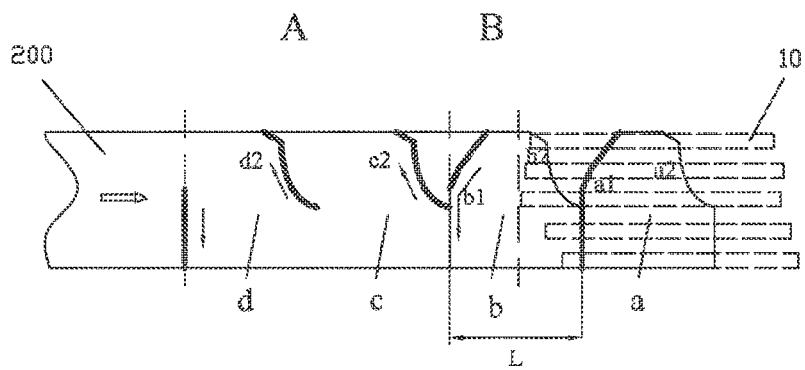
FIGS. 5-7 are schematic diagrams showing the cutting of an uncoiling and blanking method of a second embodiment of the present invention.
Figure 6:
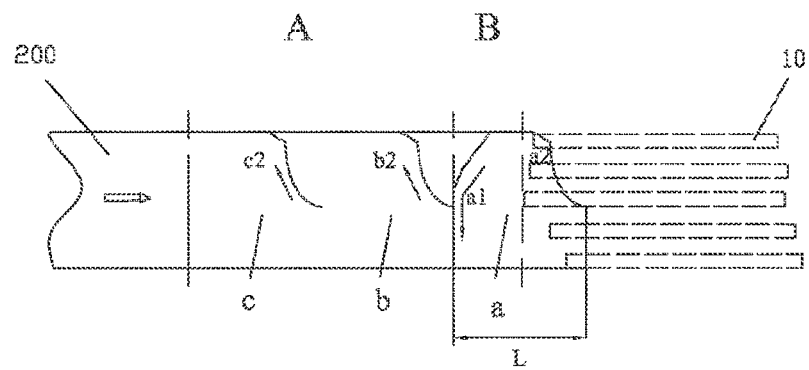
Figure 7:
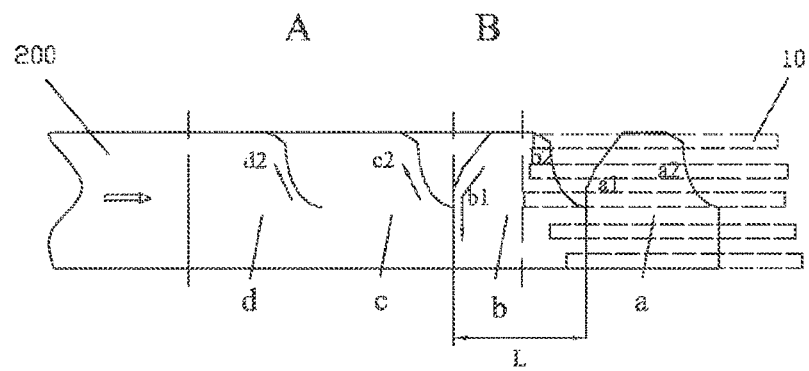

Referring to FIGS. 5-7, FIGS. 5-7 show cutting of two sheets (fender panels, with dimensions in length and width of 1020 mm×1050 mm) by a method of the present invention, in which two cutting regions A and B are combined to output two sheets.

A plate strip 200 enters a first laser cutting head cutting region A, a first laser cutting head cuts a front part a2 of a first sheet a and at the same time cuts a front part b2 of a second sheet b, without a cutting off operation between the two sheets. The plate strip 200 advances a step L, the step L corresponding to the length of one sheet. After the advancement, the first laser cutting head cuts a front part c2 of a third sheet c, and the second laser cutting head cuts the rest part a1 of the first sheet a, and separates it from the second sheet b. After the two laser cutting heads complete the cutting operations in this region, the plate strip 200 further advances a step L, the first laser cutting head cuts a front part d2 of a fourth sheet d, and the second laser cutting head cuts the rest part b1 of the second sheet b and separates it from the third sheet c; the first sheet a after the cutting is received by the receiving device 10 and conveyed on the conveying belt to the stacking region; and the above steps are repeated.

What is claimed is:

1. An uncoiling and blanking method, comprising:
    uncoiling a coiled strip, straightening the coiled strip, cutting off the leading end of the coiled strip, moving the coiled strip into a looper, and moving the coiled strip out of the looper;
    cleaning the surface of the coiled strip, and flattening;
    conveying the coiled strip on a pinch roller to perform laser cutting and blanking, wherein dual static laser cutting heads cut the coiled strip during the laser cutting, and cut-away waste materials fall down from the cutting region and are conveyed outside, wherein the waste material from the cutting region is conveyed outside in such a way that the waste material is transversely conveyed below the cutting region and falls into a side waste basket;
    completing cutting;
    cutting off the obtained sheets from each other;
    receiving the sheets by a receiving device; and
    conveying the sheets on a conveying belt to a picking up and stacking region to stack the sheets,
    wherein during a cutting operation in the cutting region, the coiled strip is stationary, and after the laser cutting head completes the cutting operation, the coiled strip is moved step by step.

2. The uncoiling and blanking method of claim 1, wherein the laser cutting process adopts a regional static cutting mode by dual laser cutting heads, with the cutting region being dynamically adjusted depending of the sheet shape.

3. The uncoiling and blanking method of claim 1, wherein two laser cutting heads are responsible for different regions of a sheet, that is, a first laser cutting head does not perform a cutting off operation between sheets in a cutting region, and the second laser cutting head performs a cutting off operation between sheets in a cutting region to separate the sheets from each other; after cutting off, the sheets are received by the receiving device and conveyed on the conveying belt to the stacking region; and after the coiled strip advances a step, cutting is continued to obtain one sheet during the step, the length of the step being determined by the length of the sheet.

4. The uncoiling and blanking method of claim 1, wherein when one sheet is cut from the cutting region, firstly the leading end of the plate strip enters a first cutting region, a first laser cutting head cuts a front part of a first sheet, and after the completion of the cutting, the plate strip advances the length of one sheet; then a second laser cutting head cuts the rest of the first sheet, and at the same time, the first laser cutting head cuts a front part of a second sheet, and the second laser cutting head separates and cuts off the first sheet from the second sheet while the first laser cutting head does not separate or cut off the first sheet from the second sheet; when the two laser cutting heads complete the cutting operations in this region, the plate strip advances a step, the first sheet is received by the receiving device and conveyed on the conveying belt to the stacking region; then the second laser cutting head cuts the rest of the second sheet, and at the same time the first laser cutting head cuts a front part of a third sheet, and the second laser cutting head separates and cuts off the second sheet from the third sheet while the first laser cutting head does not separate or cut off the second sheet from the third sheet; after the two laser cutting heads complete the cutting operations in the cutting region, the plate strip advances a step; the second sheet is received by the receiving device and then conveyed on the conveying belt to the stacking region; and such a process is repeated.

5. The uncoiling and blanking method of claim 1, wherein when more than two sheets are cut from the cutting region, the leading end of the plate strip enters a first cutting region, a first laser cutting head partially cuts the more than two sheets, and after the completion of the cutting, the plate strip advances the length of one sheet; then a second laser cutting head cuts the rest of a first sheet of the sheets, and at the same time the first laser cutting head partially cuts a third sheet, and the second laser cutting head separates and cuts off the first sheet from a second sheet; after the two laser cutting heads complete the cutting operations in this region, the plate strip advances a step, and the first sheet is received by the receiving device and conveyed on the conveying belt to the stacking region; then the second laser cutting head cuts the rest of the second sheet, and at the same time the first laser cutting head partially cuts a fourth sheet, and the second laser cutting head separates and cuts off the second sheet from the third sheet; after the two laser cutting heads complete the cutting operations in the region, the plate strip advances a step; the second sheet is received by the receiving device and then conveyed on the conveying belt to the stacking region; and such a process is repeated.

* * * * *

UNITED STATES PATENT AND TRADEMARK OFFICE
CERTIFICATE OF CORRECTION

PATENT NO. : 9,770,782 B2
APPLICATION NO. : 14/759458
DATED : September 26, 2017
INVENTOR(S) : Ruimon Wu et al.

It is certified that error appears in the above-identified patent and that said Letters Patent is hereby corrected as shown below:

In the Specification

Column 2, Line 44, "of" should be --off--.

Signed and Sealed this
Nineteenth Day of December, 2017

Joseph Matal
*Performing the Functions and Duties of the
Under Secretary of Commerce for Intellectual Property and
Director of the United States Patent and Trademark Office*